C. E. Wilcox,
Billiard Table Cushions,
No. 68,586. Patented Sept. 3, 1867.
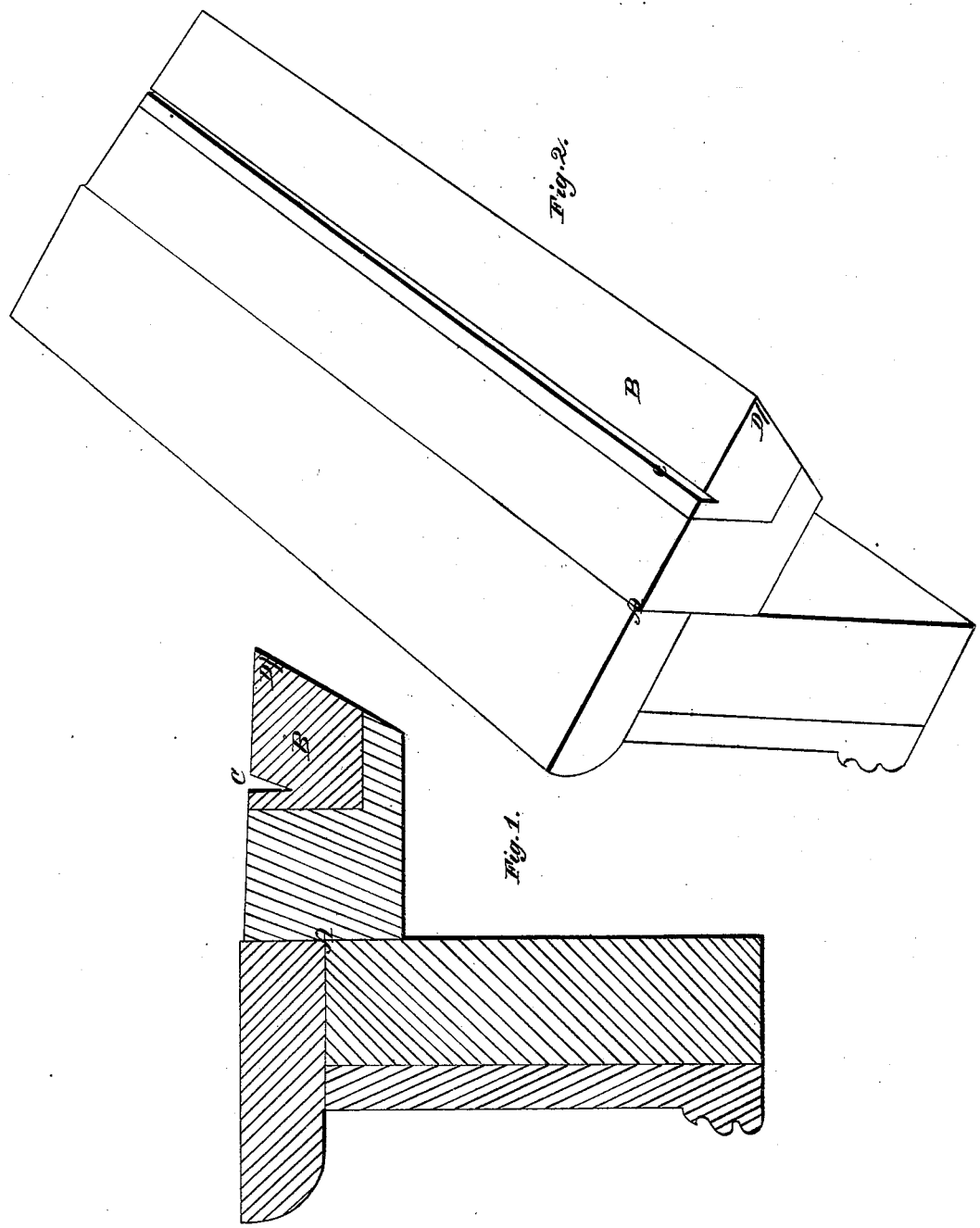
Witnesses.
W. B. Smith
L. N. Mason
Inventor.
C. E. Wilcox

United States Patent Office.

CHESTER E. WILCOX, OF MILWAUKEE, WISCONSIN.

Letters Patent No. 68,586, dated September 3, 1867.

IMPROVEMENT IN BILLIARD-TABLE CUSHIONS.

The Schedule referred to in these Letters Patent and making part of the same.

TO ALL WHOM IT MAY CONCERN:

Be it known that I, CHESTER E. WILCOX, of the city and county of Milwaukee, and State of Wisconsin, have invented a new and useful Improvement in Billiard-Table Cushions; and I do hereby declare that the following is a full, clear, and exact description thereof, which will enable those skilled in the art to make and use the same, reference being had to the accompanying drawings, forming part of this specification, in which—

Figure 1 is a perspective view.

Figure 2, a cross-section.

Similar letters of reference in each of the figures indicate corresponding parts.

The object of my invention is to make a billiard-table cushion so graduated in elasticity that a ball, when striking it, shall always leave it on an angle corresponding with the angle with which it strikes it, whether the blow struck be with greater or less force, and this I do by cutting a slot in the top of the cushion, dividing its top into two parts.

A is the cushion-frame; B, the cushion, made of rubber or other suitable elastic substance. C is a groove or slot, cut in the top longitudinally; D, a steel spring, embedded in the front of the cushion.

Operation: When the ball strikes the cushion, the steel spring D, yielding with the rubber, in which it is embedded by its stiffness, keeps the rubber from being so abruptly indented as it otherwise would be; throws the ball from it in a truer angle, and with more force than the rubber would alone. A slight blow of the ball bends or springs the forward section of the cushion back to the slot C; but when a heavy blow is struck, the front cushion is indented or sprung back, closing the slot C and pressing with more or less force against the back cushion, and its elasticity is then added to that of the front, and adds its force to throw off the ball, thus accomplishing the object sought.

What I claim as my invention, and desire to secure by Letters Patent, is—

A billiard-table cushion, when made with slot C in its top, substantially as and for the purpose described.

C. E. WILCOX.

Witnesses:
　　J. B. SMITH,
　　J. N. MASON.